Figure 1:
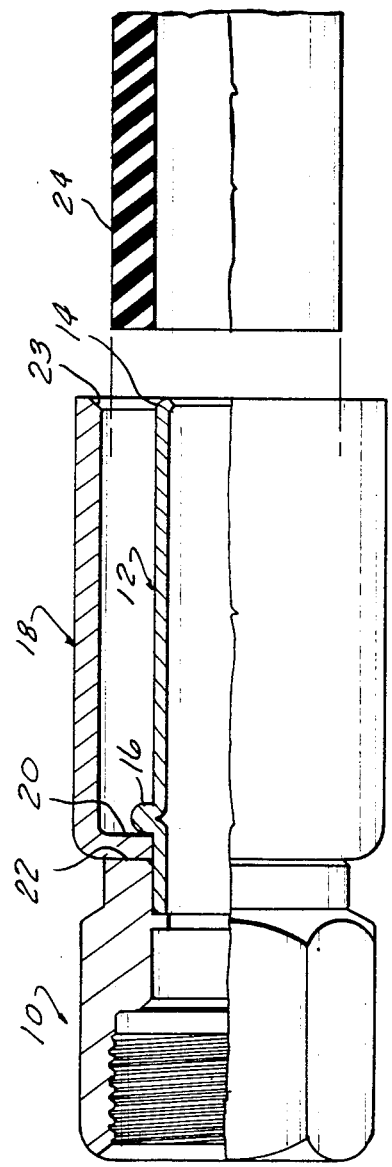

United States Patent [19]

Manning et al.

[11] Patent Number: 4,690,435
[45] Date of Patent: Sep. 1, 1987

[54] HOSE COUPLING

[76] Inventors: Thomas J. Manning, 20135 Brookwood, Dearborn Heights, Mich. 48127; Jack L. Ritzert, 831 Burr Rd., Wauseon, Ohio 43567; Joseph D. Blouin, 1400 Rolling Ridge, Sturgis, Mich. 49091; Josephine A. Mowinski, 24553 Bashian, Novi, Mich. 48050

[21] Appl. No.: 837,187

[22] Filed: Mar. 7, 1986

[51] Int. Cl.⁴ .................................. F16L 33/20
[52] U.S. Cl. ............................ 285/256; 285/259
[58] Field of Search .................. 285/256, 259, 258

[56] References Cited

U.S. PATENT DOCUMENTS

| | | | |
|---|---|---|---|
| 1,944,890 | 1/1934 | Heidloff | 285/259 X |
| 2,374,225 | 4/1945 | Melsom | 285/256 X |
| 3,017,203 | 1/1962 | Macleod | 285/256 |
| 3,220,753 | 11/1965 | Kasidas | 285/256 X |
| 3,222,094 | 12/1965 | Robinson et al. | 285/256 |
| 3,530,900 | 9/1970 | Kish | 285/256 X |
| 3,549,180 | 12/1970 | MacWilliam | 285/256 |
| 3,690,703 | 9/1972 | Philipps | 285/256 X |
| 4,114,656 | 9/1978 | Kish | 285/256 X |
| 4,330,142 | 5/1982 | Paini | 285/256 |
| 4,381,594 | 5/1983 | Levande et al. | 285/256 X |
| 4,498,691 | 2/1985 | Cooke | 285/256 X |
| 4,522,435 | 6/1985 | Miller et al. | 285/259 |

FOREIGN PATENT DOCUMENTS

| | | | |
|---|---|---|---|
| 1247092 | 8/1967 | Fed. Rep. of Germany | 285/256 |
| 1936361 | 1/1971 | Fed. Rep. of Germany | 285/256 |
| 2258207 | 8/1973 | Fed. Rep. of Germany | 285/256 |
| 2459690 | 6/1975 | Fed. Rep. of Germany | 285/256 |
| 67815 | 6/1977 | Japan | 285/256 |
| 2035498 | 6/1980 | United Kingdom | 285/256 |

*Primary Examiner*—Thomas F. Callaghan
*Attorney, Agent, or Firm*—Basile, Weintraub & Hanlon

[57] ABSTRACT

A hose coupling for permanent attachment to a hose having a reinforcing braid layer intermediate inner and outer layers of rubber or plastic has an outer sleeve which is circumferentially crimped to the hose at at least four axially spaced rings. The coupling includes a smooth walled insert inside the hose engaging the inner surface of the hose.

2 Claims, 2 Drawing Figures

HOSE COUPLING

BACKGROUND OF THE INVENTION

This invention relates generally to a metallic hose coupling for flexible rubber and plastic hose, and more particularly, to a permanent attached hose coupling which is crimped in place on the end of the hose.

Hose ends of the permanently attached type generally comprise a unitary assembly having a tubular insert member which extends within the bore of the hose and an outer sleeve member extending over the outer surface of the hose for substantially the same length as the insert extends within the hose. Usually, the outer sleeve is a separate piece from the insert, and is permanently secured to the insert by suitable means, such as a mechanical deformation or welding, and the insert extends beyond the sleeve to terminate in a suitable threaded fitted portion.

Two of the most important requirements of a hose fitting are, first, that it provides a seal with the hose so as not to allow the fluid within the hose to leak to the exterior of the assembly, and, second, that it grip the hose with sufficient force against the axial pressure forces exerted when the system is pressurized to prevent physical separation of the fitting and hose. This can be obtained by providing what is known as a "bubble crimp" with a generally thin outer sleeve wall of uniform thickness. In forming such a crimp, the crimping dies are provided with a plurality of annular ridges and grooves which force the outer sleeve into a similar configuration in which the sleeve is deformed inwardly a greater amount at a number of axially spaced points, with reduced deformation intermediate these points.

Other problems that are encountered often result from variations in tolerances not only of the metal hose end, but also of the rubber or plastic tube, which generally has one or more layers of fabric or wire braid interposed between inner and outer layers of rubber or plastic, and in some cases may also be covered by a braided layer of fabric or wire. Generally, such hoses ends are attached to a hose in a machine in which a plurality of collet segments are moved radially inward to deform the metal, and the amount of such deformation is generally fixed by stops within the crimping machine. If, as a result of tolerance variations, the gripping produced by the crimping segments is insufficient, the hose end may permit leakage between the insert and the inner wall of the hose, past the end of the hose and thence toward either past the attachment of the outer sleeve to the insert or along the outer surface between the hose and the sleeve. Also in such case, exposure of the hose to high pressure may cause the hose end to lose its grip on the hose so that the hose end is blown off and separated from the hose. On the other hand, if the deformation produced by the crimping machine is too great, the hose may be physically damaged, particularly by crushing or weakening the braid layers in the hose, as well as by cutting of the rubber or plastic materials, and, as a result, the hose may fail by fatigue as the result of continued flexing or pressure pulsing within the hose.

SUMMARY OF THE INVENTION

The present invention provides an improved gripping and sealing arrangement for a permanently attached hose end utilizing a bubble crimp on the outer sleeve. This is done by providing a controlled compression of the hose between the sleeve and the insert at a plurality of axially spaced rings. The sleeve is provided with a bubble-type crimp in which the sleeve is reduced in diameter at at least four axially spaced crimp rings. These four axially spaced crimp rings are designed to create four separate circumferential pressure points complete and without voids to seal and grip the hose end and encapsulate the hose material between the rings at three areas of lesser deformation, referred to as bubbles, to allow expansion and contraction of the hose material due to changes in temperature and pressure, and due to aging of the hose material over an extended period of time.

This arrangement is adapted to accommodate variations in tolerance of the hose, including wall thickness, as well as variations in the outer diameter because the space between the axially spaced crimp rings allows a redistribution of the rubber and plastic hose material to further ensure that the progressive zones of compression encapsulate the hose material between the axially spaced crimp rings allowing for expansion and contraction of the hose material. Further, the crimp design, which includes a chamfer on the inside diameter at the end of the outer sleeve overlying a radius on the end of the insert, is intended to provide sealing and gripping of the hose with minimum damage to the hose material in the zones of greatest flexing and working of the hose material.

Furthermore, where crimping action would normally cause the end of the outer sleeve to flare outwardly to a diameter greater than the outer diameter of the sleeve before crimping, this invention is designed to contain the sleeve at at least the same if not less than the outer diameter of the sleeve before crimping, and preferably have the inner diameter of the sleeve at the end of the sleeve in contact with the outer diameter of the hose.

This is an improved crimp design since it greatly reduces the possibilities of an adjacent component from being cut or abraded by the flare that would be created by the crimping action on the sleeve if it were not contained as described. And, due to the chamfer on the inside diameter at the end of the sleeve along with the radius of the end of the insert, the containment of the sleeve at the end of sleeve will have minimum damage of the hose material in the zones of greatest flexing and working of the hose material.

Further, this design also incorporates a smooth surface on the exterior of the insert, that is, the surface in contact with the interior of the hose in order to minimize the possibilities of the crimping action and/or the use of the part from creating an imperfection in the interior of the hose that is in contact with the insert and subsequently causing a failure of the coupling. The smooth outer diameter of the insert is an improved design in contrast to a common practice of utilizing annular ridges and intervening grooves of various shapes and sizes in order to ensure gripping and sealing characteristics.

Other objects and features of the invention will become apparent by reference to the following specification and to the drawings.

IN THE DRAWINGS

Figure 2:
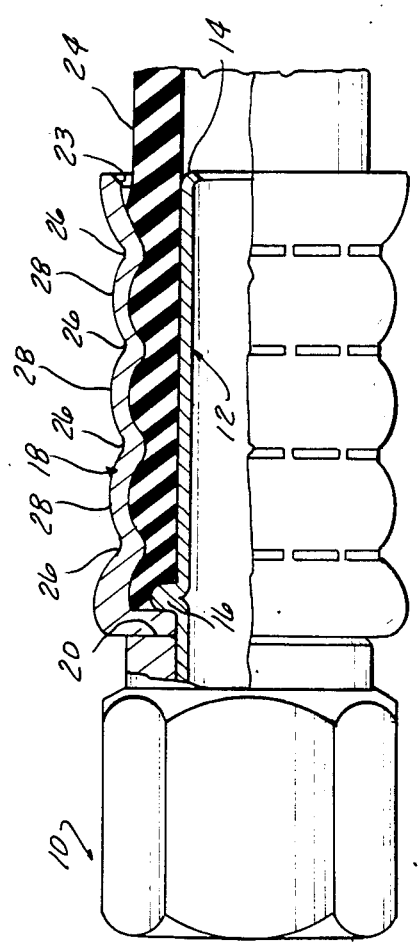

FIG. 1 is a side elevational view, partially in section, of a hose coupling embodying the present invention prior to its assembly to the hose; and FIG. 2 is a side elevational view, partially in section, showing the coupling of FIG. 1 assembled upon the end of a hose.

Referring first to FIG. 1, a coupling embodying the present invention is shown in its as manufactured form prior to being assembled upon the end of a hose. The coupling includes a fitting designated generally 10, to which is fixedly secured a hollow tubular insert or inner sleeve 12, which projects coaxially from one end of fitting 10. The distal end that is the end of inner sleeve 12 remote from fitting 10—is formed with a smoothly curved outwardly convex annular surface as at 14, and an annular radially extending projecting lock bead or flange 16, is formed on inner sleeve 12 near the end of the sleeve adjacent fitting 10. The outer surface of sleeve 12 in its extent between flange 16 and end surface 14 is a smooth, continuous cylindrical surface.

A hollow tubular outer sleeve 18, of uniform wall thickness is coaxially mounted upon inner sleeve 12, and formed at one end with a radially inwardly projecting annular lip 20 which radially overlaps flange 16 and is trapped between flange 16, and the end 22 of fitting 10. Fitting 10, inner sleeve 12 are fixedly secured to each other by any suitable means, such as brazing. Outer sleeve 18 is then in turn fixedly secured to fitting 10 and inner sleeve 12 by any suitable means, such as mechanical deformation of inner sleeve 12 known as a lock bead.

At the right hand end of the coupling as viewed in FIG. 1, there is shown an end portion of a hose 24, upon which the coupling is designed to be mounted. The outer diameter of inner sleeve 10 which, as seen in FIG. 2 is axially inserted into the end of the hose during assembly, is substantially equal to the internal diameter of hose 24, while the inner diameter of outer sleeve 18 is somewhat larger than the outer diameter of hose 24.

The coupling is assembled upon the end of hose 24 by conventional and well known apparatus operable to apply what is termed as a bubble crimp to outer sleeve 18 to deform outer sleeve 18 into the form shown in FIG. 2. In such machines, essentially radially acting dies disposed around the circumference of the outer sleeve 18 and are driven radially inwardly to deform the originally cylindrical outer sleeve into the configuration shown in FIG. 2, this configuration corresponding to the radially inner surfaces of the dies.

As best seen in the cross-sectional portion of FIG. 2, the outer sleeve during the assembly process is formed with four (or more) circumferentially extending annular reduced diameter crimp sections 26, which are uniformly spaced axially along outer sleeve 18, and separated from each other by outwardly bulged intermediate sections 28. The minimum internal diameter of outer sleeve 18 at each of crimp sections 26 is less than the normal outer diameter of hose 24, while the maximum internal diameter of the outwardly bulged sections 28 is somewhat larger than the normal outer diameter of hose 24. The hose material is normally of rubber or a synthetic material which will "flow", when locally compressed, and the final configuration of outer sleeve 18 is radially dimensioned over the axial extent of the crimped sections 26 such that the volume of the annular region between this axial portion of outer sleeve 18 and the outer surface of inner sleeve 12 is substantially equal to the original volume of that portion of the hose located in this region during upon assembly. In other words, the volume of hose material displaced by the crimped sections 26 will fill the adjacent outwardly bulged sections 28.

The employment of at least four crimped sections 26, provides adequate assurance that an adequate fluid seal is achieved without deformation of inner sleeve 12. In effect, the arrangement presents four annular seals between the inner surface of the hose and inner sleeve 12, one of such seals being created by each of the crimped sections 26. The four clamping type seals in series permit each of the seals to be applied with a lesser clamping force than would be the case if outer sleeve 18 were crimped at only one or two locations.

The dimensional relationship between the inner and outer sleeves and the wall thickness and outer diameter of the hose assures that the outwardly bulged sections 28 will encapsulate the hose to provide an adequate axial retention between the hose and coupling to resist axial withdrawal of the hose from its assembled relationship with the coupling. The annular curved end 14 of inner sleeve 12 and the chamfer 23 at the inner side of the end of outer sleeve 18 minimize wear and tear on the hose due to flexing of the hose laterally relative to the coupling.

While one embodiment of the invention has been described in detail, it will be apparent to those skilled in the art that the coupling as described may be modified. Therefore, the foregoing description is to be considered exemplary rather than limiting, and the true scope of the invention is that defined in the following claims.

What is claimed is:

1. In a hose coupling of the type wherein an end section of a hose is inserted coaxially between an inner sleeve and an outer sleeve and the outer sleeve in subsequentially radially crimped at axially spaced locations to circumferentially clamp the hose end section against the inner sleeve;

the improvement wherein said hose coupling comprises a fitting including an elongate hollow tubular inner sleeve fixedly projecting from one end of said fitting to a distal end, said distal end of said inner sleeve having an annular outwardly convex curved surface, means defining a radially outwardly projecting annular flange on an inner sleeve adjacent said one end of said fitting, said inner sleeve having a smooth continuous cylindrical outer surface extending from said flange to said distal end, an elongate hollow tubular outer sleeve of uniform wall thickness coaxially mounted upon said inner sleeve, a radially inwardly projecting annular lip at one end of said outer sleeve radially overlapping and seated against the side of said flange adjacent said one end of said fitting, said outer sleeve extending from said flange to an outer end substantially aligned with said distal end of said inner sleeve, a hose having an end section coaxially received between said inner and outer sleeves with the end of said end section engaged with said flange and said lip, means defining at least four annular reduced diameter circumferentially crimped sections at uniformly spaced locations between the opposite ends of said outer sleeve, said crimped sections having an internal diameter less than the normal outer diameter of said hose to circumferentially clamp said hose against said smooth cylindrical outer surface of said inner sleeve at least four axially spaced locations, said crimped sections being separated from each other by outwardly bulged intermediate sections having a maximum internal diameter greater than that of the normal outer diameter of said hose, the outer end of said outer sleeve terminating at an outwardly flared end section having an annular chamfered inner edge radially spaced from the hose, the outer diameter D of such outer sleeve adjacent said annular lip is greater than the maximum diameter of said outwardly bulged inner portions and the maximum diameter of said flared end section is approximately equal to D.

2. In a hose coupling of the type wherein an end section of a hose is inserted coaxially between an inner sleeve and an outer sleeve and the outer sleeve in subsequentially radially crimped at axially spaced locations to circumferentially clamp the hose end section against the inner sleeve;

the improvement wherein said hose coupling comprises a fitting including an elongate hollow tubular inner sleeve fixedly projecting from one end of said fitting to a distal end, said distal end of said inner sleeve having an annular outwardly convex curved surface, means defining a radially outwardly projecting annular flange on said inner sleeve adjacent said one end of said fitting, said inner sleeve having a smooth continuous cylindrical outer surface extending from said flange to said distal end, an elongate hollow tubular outer sleeve of uniform wall thickness coaxially mounted upon said inner sleeve, a radially inwardly projecting annular lip at one end of said outer sleeve radially overlapping and seated against the side of said flange adjacent said one end of said fitting, said outer sleeve extending from said flange to an outer end substantially aligned with said distal end of said inner sleeve, a hose having an end section coaxially received between said inner and outer sleeves with the end of said end section engaged with said flange and said lip, means defining at least four annular reduced diameter circumferentially crimped sections at uniformly spaced locations between the opposite ends of said outer sleeve, said crimped sections having an internal diameter less than the normal outer diameter of said hose to circumferentially clamp said hose against said smooth cylindrical outer surface of said inner sleeve at least four axially spaced locations, said crimped sections being separated from each other by outwardly bulged intermediate sections having a maximum internal diameter greater than that of the normal outer diameter of said hose, the outer end of said outer sleeve terminating at an outwardly flared end section having an annular chamfered inner edge radially spaced from the hose, wherein the minimum internal diameter of said outer sleeve at said reduced diameter crimped sections and the normal outer diameter of said hose and the maximum internal diameter of said outwardly bulged intermediate sections are such that material of said hose displaced by said reduced diameter crimped sections fills the interior of the adjacent outwardly bulged sections, and wherein the outer diameter D of said outer sleeve adjacent said annular lip is greater than the maximum diameter of said outwardly bulged inner portions and the maximum diameter of said flared end section is approximately equal to D.

* * * * *